Feb. 25, 1930.  C. BREER  1,748,702
MOTOR VEHICLE
Filed Aug. 6, 1926

Inventor
Carl Breer
By King Harness
Attorney

Patented Feb. 25, 1930

1,748,702

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

MOTOR VEHICLE

Application filed August 6, 1926. Serial No. 127,612.

It is universal practice in the manufacture of motor vehicles to provide a universal joint in the propeller shaft of the vehicle and it is quite customary to protect this universal joint against the entry of dirt or other foreign matter by providing a cover or boot encircling the shaft and covering either the entire universal joint or the space between one portion of the shaft and a housing for the joint. It has been found that when the universal joints are lubricated, there is a tendency for the lubricant to gather in one section of the cover or boot and, with the assistance of the centrifugal force of the rotating shaft, form a lump or mass on one side of the shaft the weight of which tends to unbalance the shaft itself.

It is the primary object of my invention to overcome this difficulty and prevent the gathering of excess amounts of lubricant in one section of the cover or boot by providing means yieldingly drawing the intermediate portion of the boot or cover so as to cause the same to follow the contour of the surrounding parts and prevent or tend to prevent gathering of any great amount of lubricant on any one side of the shaft.

With the above and other objects in view, my invention consists in the arrangement, combination and construction of the various parts of my improved device, as described in the specification, claimed in my claims and shown in the accompanying drawings, in which:

Figure 1:
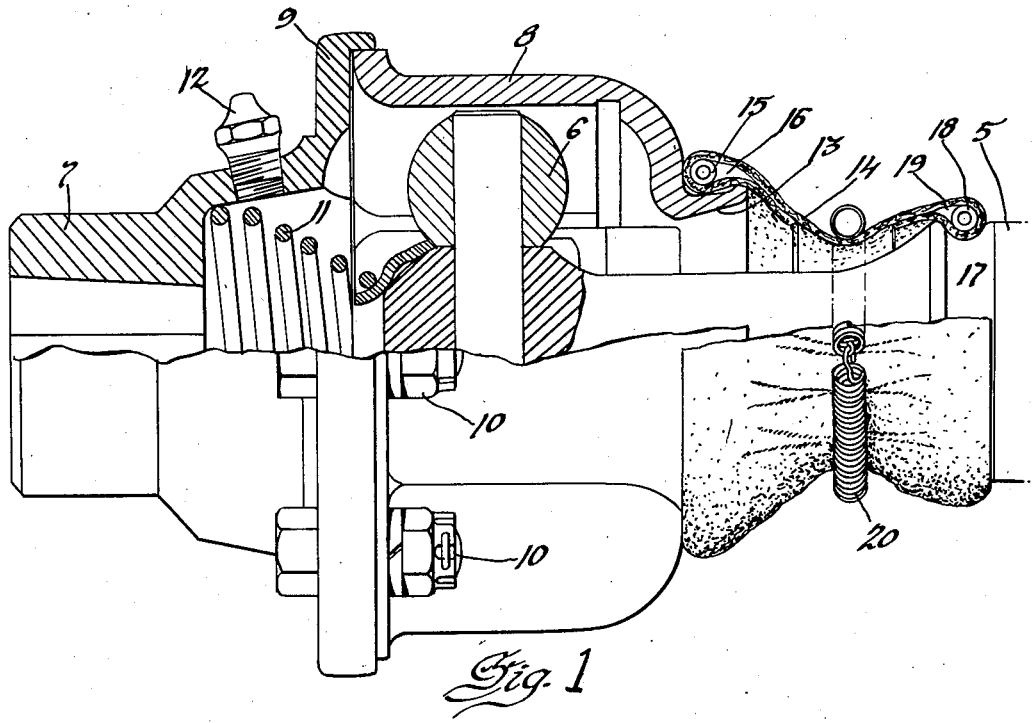
Fig. 1 is a view partly in section and partly in elevation of a propeller shaft to which my invention is applied.
Figure 2:
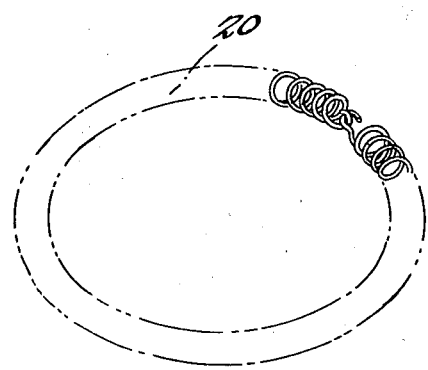
Fig. 2 is a perspective view of the coil spring utilized as the yielding means drawing the intermediate portion of the cover or boot inwardly.

I have shown one section 5 of a propeller shaft which is adapted to be joined by any suitable universal joint mechanism such as is generally indicated at 6 to a sleeve 7 adapted to receive another section of the shaft.

A housing 8 is secured to the flange 9 of the sleeve 7 by means of a plurality of bolts and nuts indicated generally as 10. A coil spring 11 is provided within the sleeve 7 adapted to permit of yielding longitudinal movement of the shaft sections relative to each other and a conventional lubricating nipple 12 is provided in the side wall of the sleeve.

The housing 8 is provided with a flange 13 around which one end of a cover or boot 14 is passed, the said end being secured in place by a coil spring 15 provided within the loop 16 thereof. A channel 17 is provided in the shaft 5 and the other end of the cover or boot 14 is held in this channel by means of a coil spring 18 provided within the loop 19 thereof.

The construction as just described is more or less conventional for covering the opening between the housing 8 and the shaft 5 to exclude dirt and other foreign matter. In order to cause the intermediate portion of the cover or boot 14 to be drawn inwardly toward the shaft 5 and thereby prevent the gathering of large amounts of lubricant on any one side thereof I have provided a third coil spring 20 in securing the cover 14 intermediate its ends and yieldingly holding the intermediate portion of the cover against outward expansion. When the shaft sections move longitudinally and particularly when they tend to separate so as to draw taut the cover 14, the spring 20 may expand to accommodate the movement.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, a pair of shafts, a universal joint coupling the shafts together, means for excluding dirt from said joint including a flexible cover connected at one end with one shaft and at the other end with the other, and yielding means drawing said cover inwardly intermediate its ends.

2. In combination, a pair of shafts, a universal joint coupling the shafts together, means for excluding dirt from said joint including a flexible cover connected at one end with one shaft and at the other end with the other, and a coil spring encircling the cover intermediate its ends and drawing the same inwardly toward the axis of rotation.

CARL BREER.